(12) United States Patent
Foley et al.

(10) Patent No.: US 7,240,569 B2
(45) Date of Patent: Jul. 10, 2007

(54) LOAD TEST APPARATUS FOR SHIPPING CONTAINERS

(75) Inventors: Lawrence E. Foley, Lafayette, LA (US); Paul Justin, Youngsville, LA (US); Gregory Smith, Lafayette, LA (US)

(73) Assignee: IntegrCert, LLC, New Iberia, LA (US)

( * ) Notice: Subject to any disclaimer, the term of this patent is extended or adjusted under 35 U.S.C. 154(b) by 0 days.

(21) Appl. No.: 11/241,302

(22) Filed: Sep. 28, 2005

(65) Prior Publication Data

US 2006/0065059 A1   Mar. 30, 2006

Related U.S. Application Data

(60) Provisional application No. 60/614,303, filed on Sep. 28, 2004.

(51) Int. Cl.
*G01D 7/00* (2006.01)
(52) U.S. Cl. .................................. 73/862.041
(58) Field of Classification Search ........... 73/862.393, 73/862.392, 862.381, 862.391, 862.041
See application file for complete search history.

(56) References Cited

U.S. PATENT DOCUMENTS

| 6,848,322 B2 | 2/2005 | Scarborough |
| 6,935,196 B1 * | 8/2005 | Tumlin ................. 73/862.393 |

\* cited by examiner

*Primary Examiner*—Jewel Thompson
(74) *Attorney, Agent, or Firm*—William W. Stagg

(57) ABSTRACT

Load test apparatus for shipping containers comprising a horizontal beam (200), the beam having pivotal plate assemblies (210) attached to lifting eyes (330) or other feature of a container by cables (130) or similar means, extending from the pivotal plates to the lifting eyes. The pivotal plates rotate about a horizontal pin (430) permitting the pivotal plates to become axially aligned with the cables. The Horizontal beam is forced vertically upward by a plurality of force generating means such as hydraulic cylinders (120). The force of the force generating means is applied through a point common to the longitudinal axis of the horizontal beam and the axis of the horizontal pin, thereby eliminating moment loads within components of the assembly. The opposite vertically downward reaction force is applied to the bottom of the container and simulates the force applied by the weight of the typical contents of the container when it is in use.

18 Claims, 6 Drawing Sheets

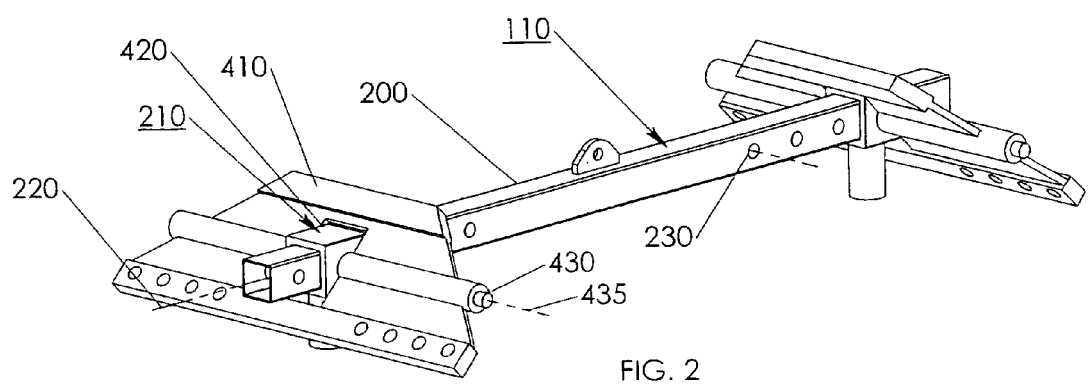
FIG. 2
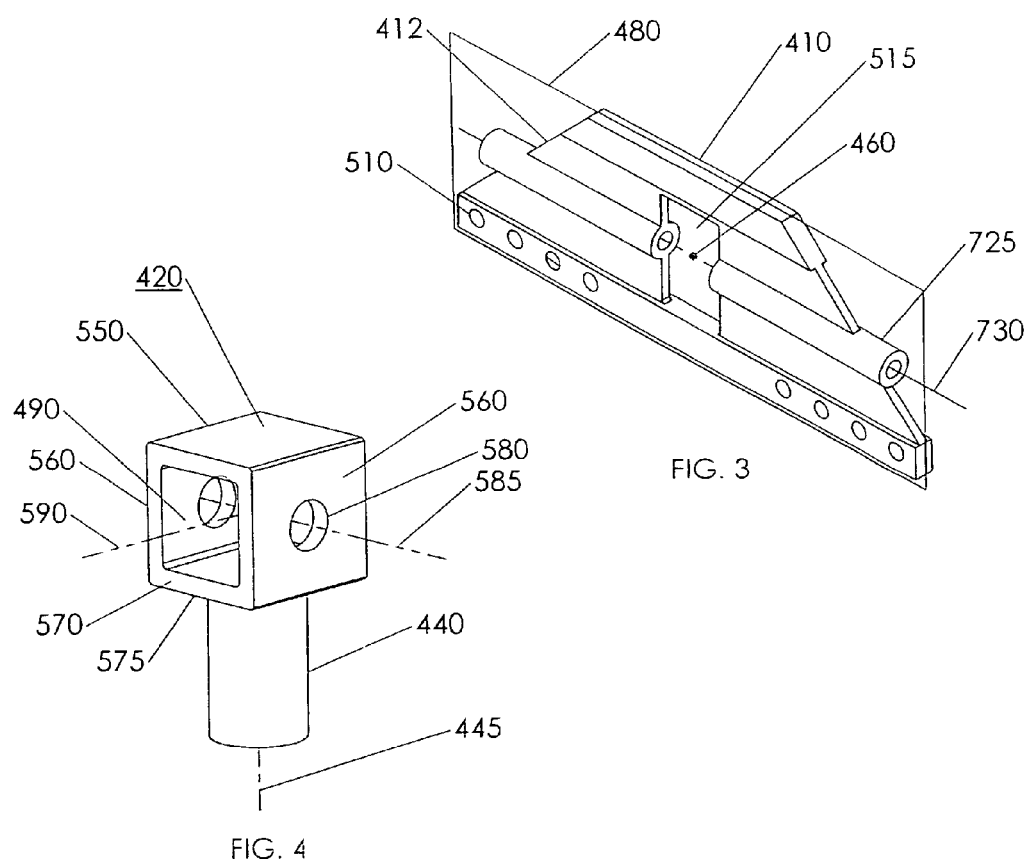
FIG. 3
FIG. 4

LOAD TEST APPARATUS FOR SHIPPING CONTAINERS

This application claims priority to U.S. Provisional Application Ser. No. 60/614,303 for Load Test Apparatus for Shipping Containers filed Sep. 28, 2004 by the above referenced Applicants, the entire contents of which are hereby incorporated by reference.

FEDERALLY SPONSORED RESEARCH

Not Applicable

SEQUENCE LISTING OR PROGRAM

Not Applicable

BACKGROUND

1. Field of Invention

This invention relates to the load testing of structures that are lifted or suspended by one or more cables or chains, collectively referred to as "Shipping containers". The test apparatus applies a load to the lifting points of the containers, known as pad eyes, and simulates the application of loads present in the container when it is lifted or suspended.

2. Background

Shipping containers are designed, manufactured and tested in compliance with one or more specifications published by governmental and private organizations. These specifications require that the container be load tested to a multiple of the rated load of the container. The most popular method used to apply the test load is to fill the container with heavy objects such as concrete, steel, water, etc. This method is time consuming, expensive, and of questionable accuracy.

A second method is to use a hydraulic ram to apply a load to a cable attached to one or more pad eyes, where the reaction of this load is applied to the container near the pad eye being tested. This method applies the load only to the pad eye and not to the entire structure of the container. Therefore, this method does not simulate the actual loads applied the contents of the container when it is in use.

A third method is to use a single telescopic mast to apply a load to cables attached to two or more of the pad eyes. The reaction of this load is applied to the bottom of the structure, more closely simulating the loads applied by the contents of the container when it is in use. This method works well for smaller containers whose length and width are nearly equal, i.e., the container is nearly square. However, it is common for containers to have a large aspect ratio, where the length is several times the width, i.e., the containers are long and narrow.

Containers of large aspect ratios present at least two significant problems to the single telescopic mast method of application of the test load. First, the apparatus must be tall enough to allow the cables to form an angle of not less than 45 degrees with the horizontal. Such a test apparatus must be heavy enough not to fail by buckling when the test loads are applied and, because of the height and weight requirements, the apparatus presents a safety hazard to personnel setting up and operating the apparatus. The second problem with the single telescopic mast method is that the load is applied to a relatively small area at the center of the container unless large, heavy beams are used to distribute the load along the base of the container.

Considerations

A safe and efficient test apparatus for shipping containers should be compact, and easily set-up for testing. It should have a low weight-to-strength ratio, that is, it should be as light-weight as possible while being strong enough to apply and withstand the required loads. Members subject to compressive loads should be as short as possible to increase the resistance of the member to failure or excessive deformation due to buckling. It should reliably apply the test load to the lifting eyes and to the bottom of the container in such a manner so as to accurately simulate the magnitude and direction of an actual load typical to said container. The test load should be evenly distributed among the lifting eyes of the container. The design should provide a means to accurately measure the applied load and minimize the factors that contribute to measurement errors. Such factors include improper set-up resulting in improper alignment of components, improper angle between the cables and a horizontal plane, application of extraneous loads and moments to the load measuring members, and improper distribution of the reaction load to the structure of the container.

Objects and Advantages

Several objects and advantages of the present invention are:

(a) to provide a test apparatus that maximizes safety to personnel while setting up and operating the apparatus, specifically by attaining a low weight-to-strength ratio while maximizing the factor of safety of the apparatus against failure;

(b) to provide a test apparatus that reduces the weight-to-strength ratio by eliminating the application of moment loads to members of the test apparatus;

(c) to provide a test apparatus that resists failure and excessive deformation due to buckling, specifically by providing a plurality of load application members such as hydraulic cylinders;

(d) to provide a test apparatus that applies the test load to the container in a manner so as to accurately simulate the typical loading conditions applied to the container during use, specifically by applying and distributing said test loads so as to induce stresses within various members of the container; and, (e) to provide a test apparatus that accurately measures the applied test load, specifically by reducing extraneous components of the applied and reaction loads and by minimizing deformation of members of the test apparatus.

SUMMARY

In accordance with the present invention a load test apparatus for shipping containers is comprised of a plurality of hydraulic cylinders or other force generating means to apply an upward force to a structure that applies and evenly distributes said load to lifting eyes of the container to be tested. A pivotal plate assembly is attached to each force generating means and eliminates the application of moment loads to the structure.

BRIEF DESCRIPTION OF THE DRAWINGS

FIG. 2 is an isometric view of the Beam Assembly of the Apparatus shown in FIG. 1.

FIG. 3 is an isometric view of the Pivotal Plate of the Beam Assembly shown in FIG. 2.

FIG. 4 is an isometric view of the Beam Housing of the Beam Assembly shown in FIG. 2.

DETAILED DESCRIPTION OF THE INVENTION

In the reference drawings, numerals referencing assemblies are underlined.

Figure 1:
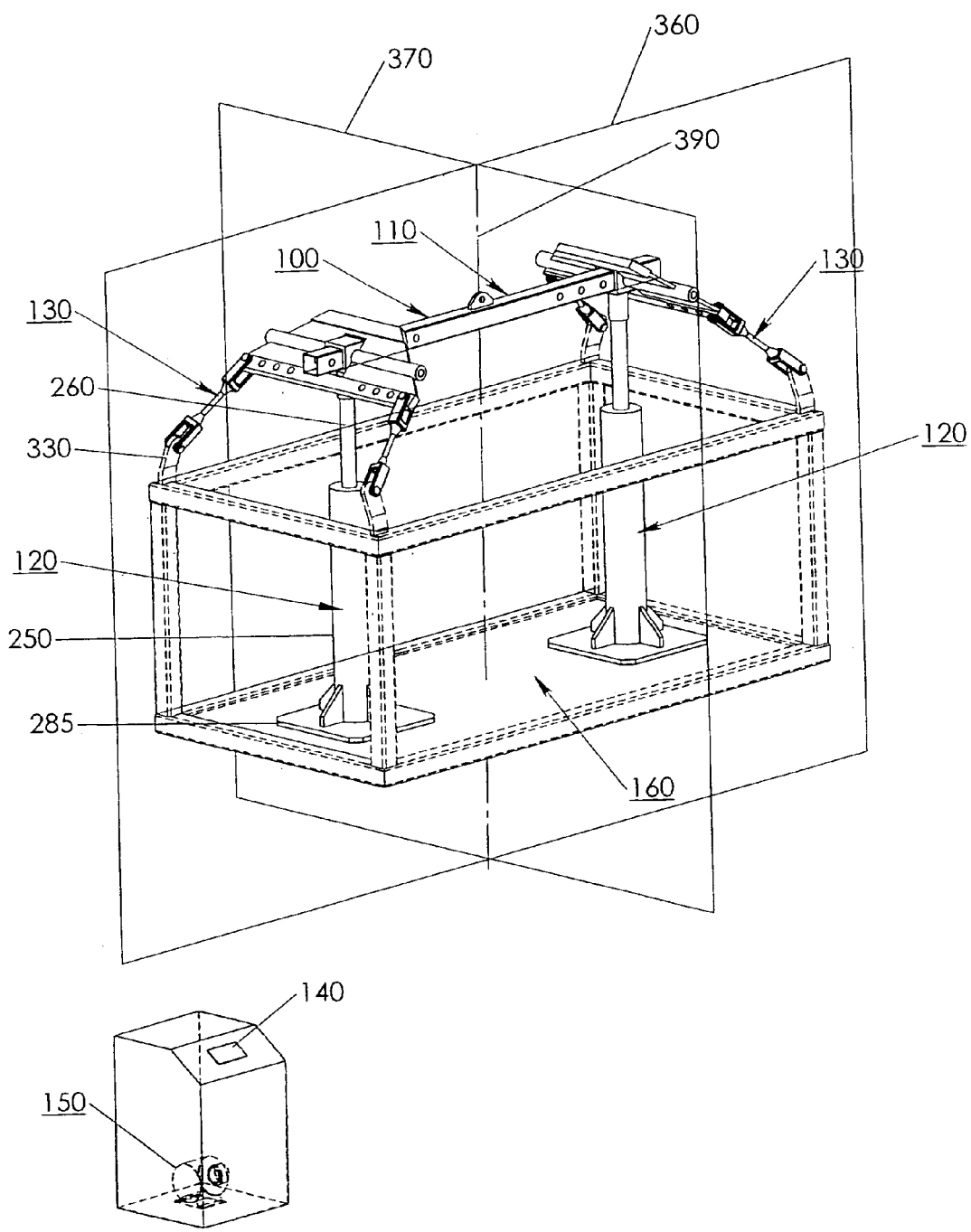
FIG. 1 is an isometric view of Load Test Apparatus of Applicants' invention.

Referring now to the drawings and more particularly to FIG. 1, there is shown an isometric view of Load Test Apparatus Assembly 100 of the present invention. The Load Test Apparatus 100 is comprised of a horizontal Beam Assembly 110, which is supported by two vertical lifting means, such as Cylinder Assemblies 120. Cylinder Assembly 120 is comprised of a Stationary Cylinder 250, a coaxial Piston Rod 260 extending vertically upward from the top of Stationary Cylinder 250, and a horizontal Base Plate 285 attached to the bottom surface of Stationary Cylinder 250. Four Cable Assemblies 130 connect the Beam Assembly 110 to four Lifting Eyes 330 of a typical Basket 160. Cylinder Assemblies 120 are pressurized by a Hydraulic Pump Assembly 150. Cylinder Assemblies 120 are connected to the Hydraulic Pump Assembly by hoses. The hoses are omitted from the drawings for clarity. The upward force produced by Cylinder Assemblies 120 is displayed by a Load Indicator 140.

The Basket 160 has a vertical centroidal axis 390, a central vertical longitudinal plane 360, and a central vertical transverse plane 370. The Basket 160 is not a component of the present invention. It is included in the drawings to more clearly show the operation of the present invention.

FIG. 2 shows the Beam Assembly 110 which is comprised of a Beam 200, and two Pivotal Plate Assemblies 210. Beam 200 has a series of horizontal Adjustment Holes 230 bored transverse to a longitudinal Axis 220 of Beam 200 and perpendicular to the sides of Beam 200. Each Pivotal Plate Assembly 210 is comprised of a Pivotal Plate 410 and a Beam Housing 420. Pivotal Plate 410 is pivotally attached to Beam Housing 420 and to Beam 200 by an Adjustment Pin 430. Adjustment Pin 430 has a longitudinal axis 435.

Referring to FIG. 3, Pivotal Plate 410 is comprised of a Wing Plate 412 and an Adjustment Pin Housing 725. Wing Plate 412 has a central rectangular thru-hole 515 and a series of cable attachment thru-holes 510 displaced from the bottom of Plate 412. The longitudinal axis 730 of Adjustment Pin Housing 725 is horizontal and is coincident with the centroid 460 of rectangular thru-hole 515. Pivotal Plate 410 has a central plane 480 parallel to the face of Pivotal Plate 410 and coincident with Centroid 460 of rectangular thru-hole 515.

Referring to FIG. 4, the Beam Housing 420 is comprised of a horizontal Top Plate 550, two vertical Side Plates 560, and a horizontal Bottom Plate 570. A Load Cell Housing 440 extends vertically downward from the bottom Plate 570. Top Plate 550, Side Plates 560, and Bottom Plate 570 are fixedly attached together so as to form a horizontal, rectangular Beam Housing Opening 490 whose dimensions are slightly larger than the outside cross-section dimensions of Beam 200, i.e., Beam 200 can fit through the Beam Housing Opening 590. A transverse thru-hole 580 is bored through both Side Plates 560 such that the axis 585 of thru-hole 580 is horizontal and is coincident with and perpendicular to the horizontal axis 590 of Beam Housing Opening 490. Bottom Plate 570 has a bottom surface 575. Load Cell Housing has a vertical longitudinal axis 445.

Figure 5:
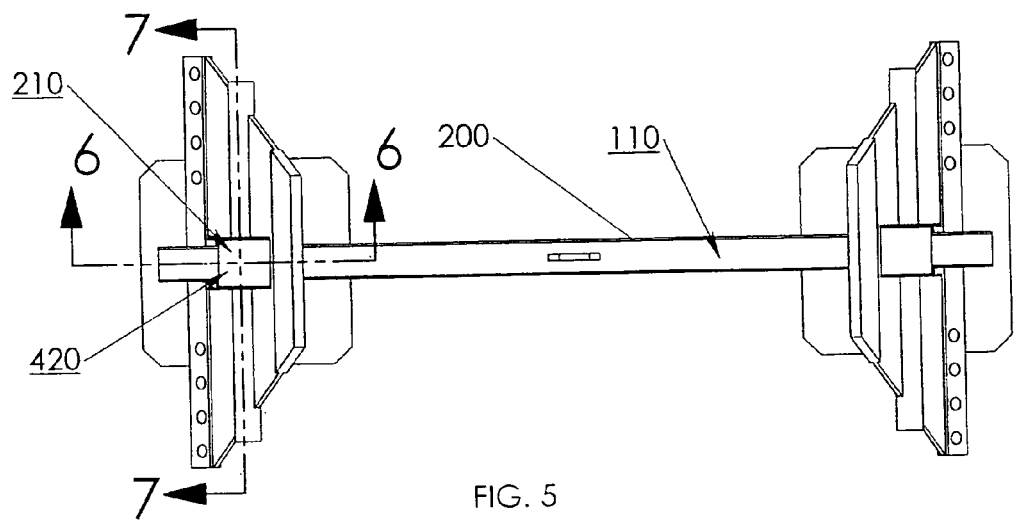
FIG. 5 is a top view of the Apparatus shown in FIG. 1.

FIG. 5 shows a top view of the Load Test Apparatus Assembly 100 showing a top view of the Beam Assembly 110. FIG. 5 is included solely to describe the location of Section 6 depicted in FIG. 6 and Section 7 depicted in FIGS. 7A and 7B.

Figure 6:
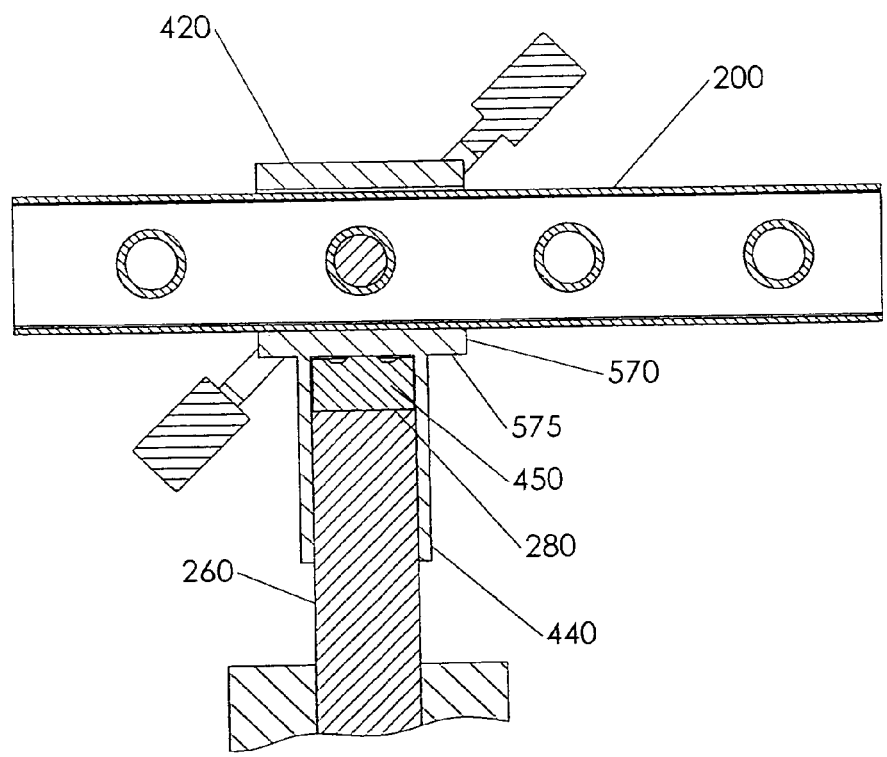
FIG. 6 shows a partial section view cut a Section 6 of FIG. 5.

FIG. 6 shows a partial section view through the Beam 200, Beam Housing 420 and the Piston Rod 260 of the Load Test Apparatus Assembly 100. Beam 200 fits within the Beam Housing Opening 490 of the Beam Housing 420 such that each Pivotal Plate Assembly 210 fits slidably onto Beam 200. A compression Load Cell 450, shown in cross-section, is sandwiched between the top surface 280 of the Piston Rod 260 and the bottom surface 575 of Bottom Plate 570. Piston Rod 260 fits slidably within Load Cell Housing 440.

Load Cell 450 may be electronic, hydraulic, or other type of compressive load cell. Load Cell 450 is connected to Load Indicator 140. This connection may be by electrical cable, radio-telepathy, or other means. The Load Cell 450 and the associated Load Indicator are standard components. The specifics of the type of Load Cell 450 and the type of Load Indicator 140 are not pertinent to the present invention. The connection between the Load Cell 450 and the Load Indicator 140 is omitted from the figures for clarity.

Figure 7A:
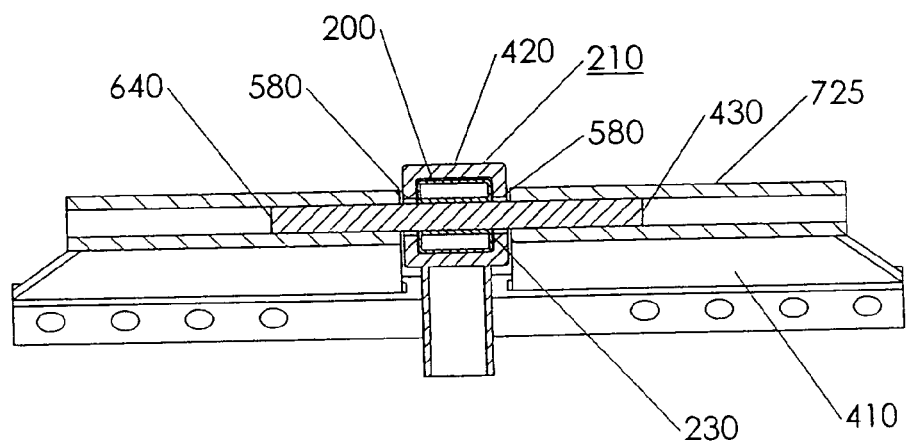
FIG. 7A shows a section view cut at Section 7 of FIG. 5 showing the Pivotal Plate Assembly and the Adjustment Pin of the Load Test Apparatus Assembly of FIG. 1.
Figure 7B:
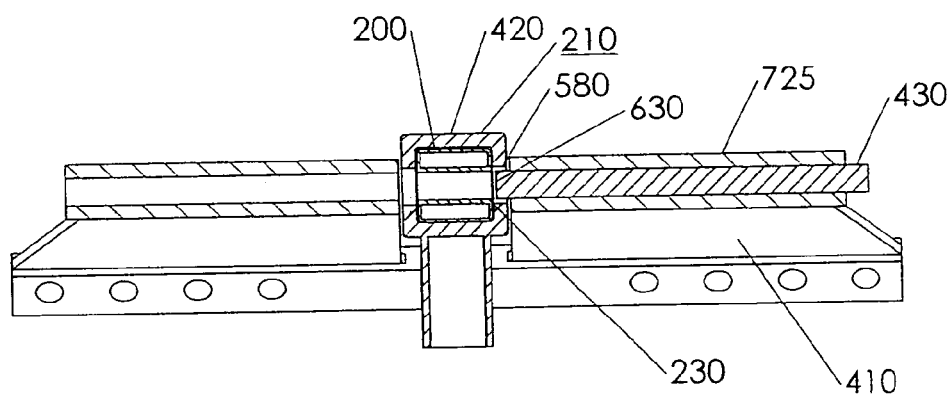
FIG. 7B shows the same section view as FIG. 7A, with the exception that the Adjustment Pin is in its Retracted Position.

FIG. 7A shows a section view cut at Section 7 of FIG. 5 showing the Pivotal Plate Assembly 210 and the Adjustment Pin 430 of the Load Test Apparatus Assembly 100. FIG. 7B shows the same section view as FIG. 7A, with the exception that the Adjustment Pin 430 is in its Retracted Position 630. The Piston Rod 260 and the Load Cell 450 are omitted from FIGS. 7A and 7B for clarity. The Adjustment Pin 430 has an Extended Position 640 and a Retracted Position 630 (seen in FIG. 7B).

In the Extended Position 640, each Adjustment Pin 430 is centered within its respective Adjustment Pin Housing 725 such that it engages both the Beam Housing 420 of the Pivotal Plate Assembly 210 and the Beam 200. Specifically, the Adjustment Pin 430 is disposed within Adjustment Pin Housing 725, thru-holes 580 of the Beam Housing 420, and a selected thru-hole 230 of the Beam 200. Thus, when the Adjustment Pin 430 is in the Extended Position 640, the respective Pivotal Plate Assembly 210 is restrained from sliding axially along Beam 200, and Pivotal Plate 410 is free to rotate about the Adjustment Pin 430.

In the Retracted Position 630, the Adjustment Pin 430 is disposed axially within Adjustment Pin Housing 725 such that it continues to engage the Adjustment Pin Housing 725 and one thru-hole 580 of Beam Housing 420, but it does not engage Beam 200. Thus, when the Adjustment Pin 430 is in the Retracted Position 630, the respective Pivotal Plate Assembly 210 is free to slide axially along Beam 200, while the Pivotal Plate 410 is still pivotally attached to the Beam Housing 420.

Figure 8:
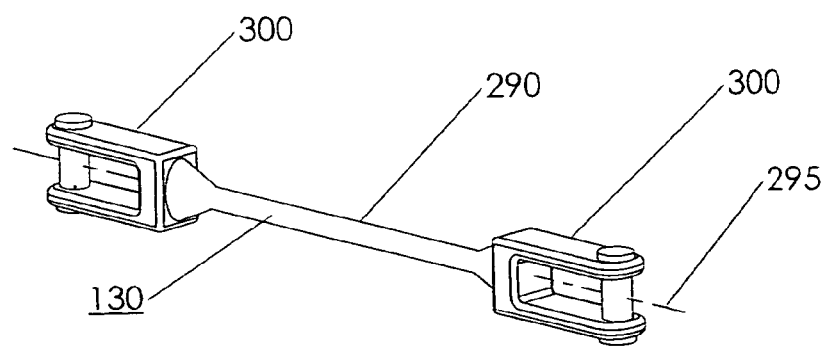
FIG. 8 shows a Cable Assembly 130 in detail.

FIG. 8 shows a Cable Assembly 130 in detail. Each Cable Assembly 130 is comprised of a steel Cable 290 with a Clevis 300 attached to each end. The Cable Assemblies 130 are of equal length. Cable 290 has a longitudinal axis 295. Cable Assemblies 130 and Clevises 300 are standard components commonly used for lifting objects. The operation of Clevis 300 is known to anyone skilled in the art of millwright.

Figure 9A:
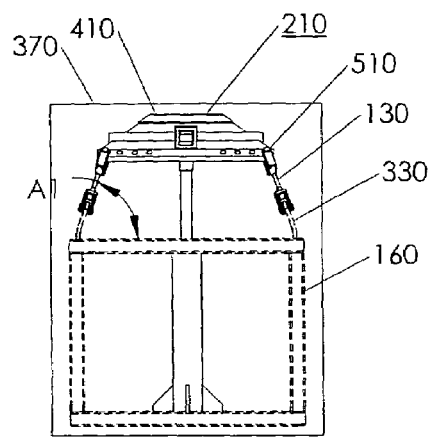
FIGS. 9A and 9B show an end view and front view, respectively, of the attachment of the Pivotal Plate Assemblies to the Basket.
Figure 9B:
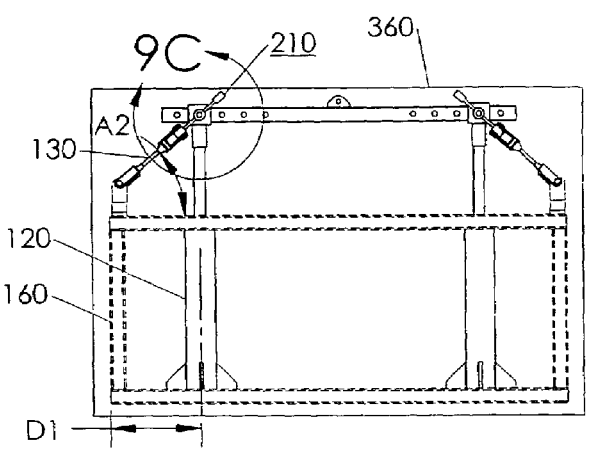

FIGS. 9A and 9B show an end view and front view, respectively, of the attachment of the Pivotal Plate Assemblies 210 to the Basket 160. A Cable Assembly 130 extends from and between a selected Thru-Hole 510 in Wing Plate 412 of the Pivotal Plate 410 to a respective Lifting Eye 330 on the Basket 160 by means of the Clevises 300. An Angle A1 between the Cable Assembly 130 and a horizontal plane is projected onto the Transverse Plane 370 of Basket 160. The projected Angle A1 is determined by which Thru-Hole 510 of Pivotal Plate 410 is selected. An Angle A2 between Cable Assembly 130 and a horizontal plane is projected onto the Longitudinal Plane 360 of Basket 160. Each Cylinder Assembly 120 is displaced a distance D1 from a respective end of Basket 160. The projected Angle A2 is determined by the distance D1. Common practice dictates that angles A1 and A2 must be greater than or equal to 45 degrees.

Figure 9C:
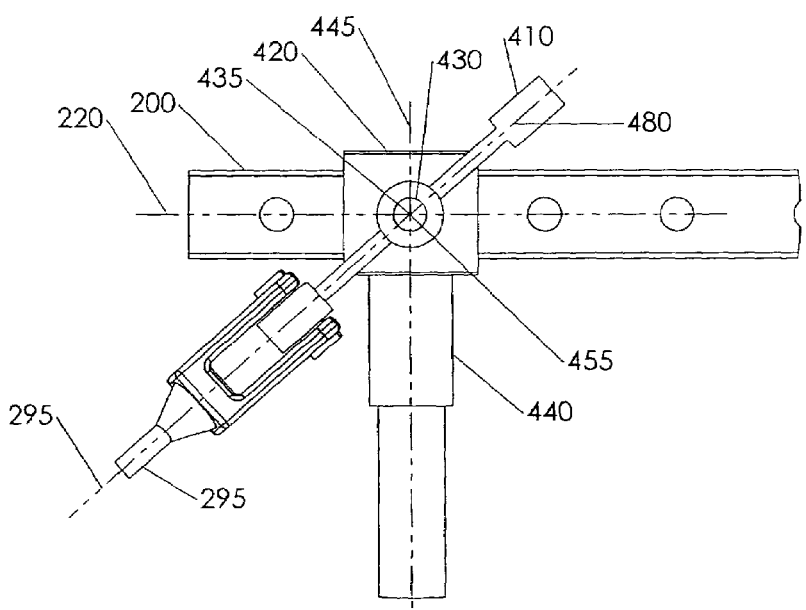
FIG. 9C shows an enlarged detail of FIG. 9B.

FIG. 9C shows an enlarged detail of FIG. 9B. In this view, Adjustment Pin 430, its axis 435, and plane 480 are perpendicular to the plane of the drawing. It can be seen that Axis 435 of Adjustment Pin 430, Axis 220 of Beam 200 and Axis 445 of Load Cell Cylinder 440 all intersect at a common point 455. Pivotal Plate 410 rotates freely about Adjustment Pin 430, thereby allowing the central Plane 480 of Pivotal Plate 410 to become coincident with Axis 295 of Cable Assembly 130. Plane 480 of Pivotal Plate 410 is coincident with Axis 435 of Adjustment Pin 430. Axis 295 of Cable Assembly 130 represents the line of action of the force transferred by Cable Assembly 130. This force is transmitted from Adjustment Pin 430, through Plate 410, through Cable Assembly 130 to Lifting Eye 330. Axis 445 of Load Cell Housing 440 represents the line of action of the upward vertical force provided by the hydraulic Cylinder Assembly 120. This force is transmitted from the Piston Rod 260 of Hydraulic Cylinder Assembly 120, through Load Cell 450, and through Bearing Housing 420 to Adjustment Pin 430. Axis 220 of Beam 200 represents the line of action of the resultant of these two forces, specifically a tensile load transmitted from Adjustment Pin 430 to Beam 200. From the preceding description, it is seen that all of the described forces are transmitted through Adjustment Pin 430.

The intersection of the lines of action of the forces referred to above is significant because the forces do not impart moment loads on any of the members. In general, stresses from moment loads are considerably greater than stresses from tensile loads. By eliminating moment loads, the members may be considerably lighter than if moment loads were present. Reduction of the weight and size of a load test apparatus significantly increases the safety of operation.

Figure 10:
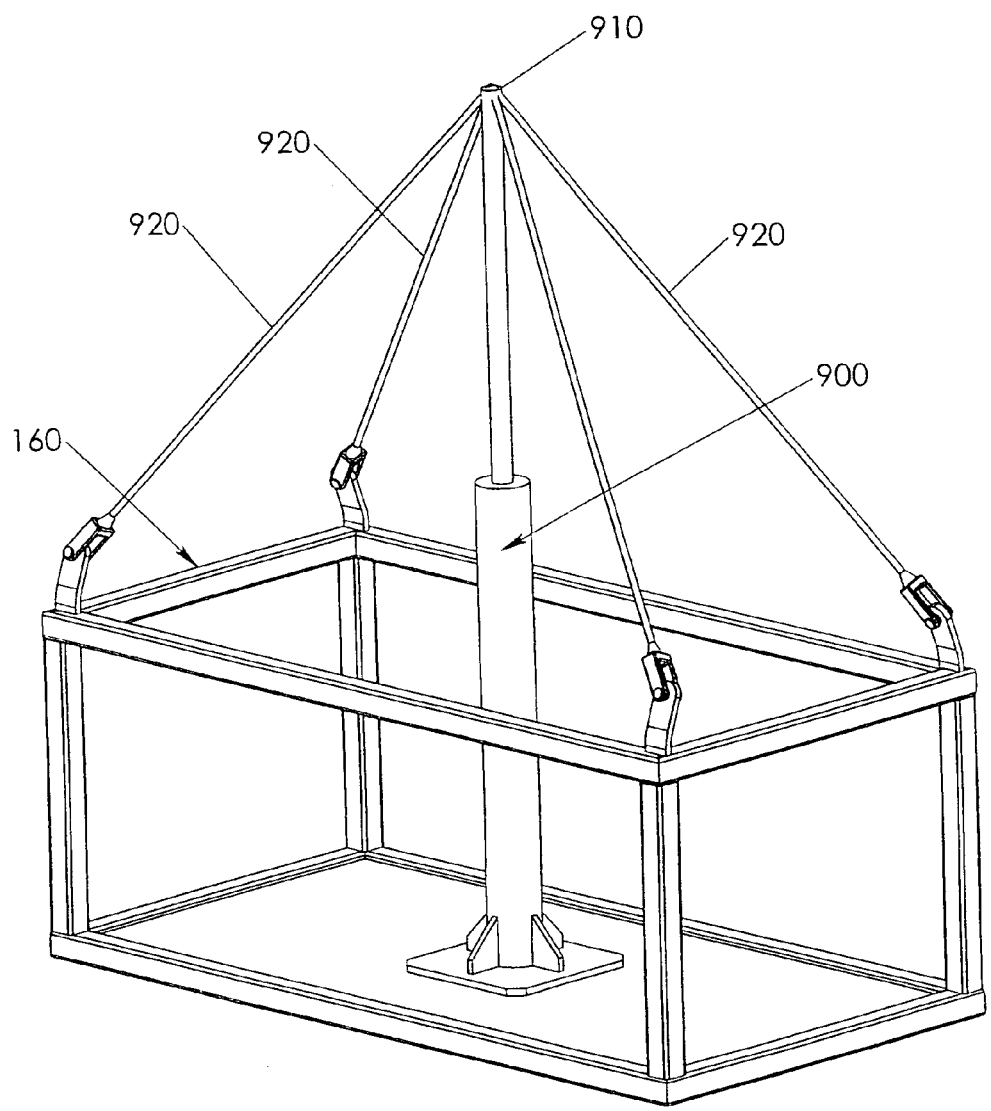
FIG. 10 shows a typical prior art load test apparatus.

FIG. 10 shows a general embodiment of the prior art. For purposes of the current discussion, the vertical lifting means, such as a hydraulic cylinder, is referred to as a column 900. A load test apparatus comprising a single force generating means, such as a single cylinder assembly, i.e., a load test apparatus comprising a single column, requires that the column extend upward from the bottom of the basket to the point of convergence 910 of each of the cable assemblies 920. This point of convergence 910 may be a considerable distance above the basket. For a projected horizontal angle of 45 degrees between Cable Assemblies 920 and the central transverse plane of Basket 160, the height of a single column must be at least one half of the longest dimension of the basket. Thus it is seen that the single column cylinder assembly must be considerably longer than the columns of the Load Test Apparatus 100 of the present invention.

Vertical members loaded in compression, generally known as columns, have a property know as a "slenderness ratio". In simple terms, the slenderness ratio is a relationship between the column's least radius of gyration and its length. The slenderness ratio of a column determines if the column is more likely to fail due to buckling rather than due to compressive axial stress. A column with a high slenderness ratio, i.e., a long, slender column, will fail due to a buckling load, known as the critical load for that column. In order to safely withstand a given load, such as the load to be applied to a basket 160 by a Load Test Apparatus, a longer column must have a larger radius of gyration than a shorter column. A longer column must therefore be larger and heavier than a shorter column designed to withstand the same load as that applied to the longer column.

Referring again to FIG. 10, it is seen that if each of the cables 920 are not exactly the same length, a side load will be induced at the top of the column 900. Similarly, a side load will be induced if the column 900 is not positioned exactly at the center of the Basket 160, i.e., not directly beneath the point of convergence of the cables. The presence of even relatively small side loads applied to the top of a long column significantly reduces the capability of the column to safely withstand a vertical load. Several factors, including human error on the part of the operator, make it inevitable that extraneous side loads will be applied to any load test apparatus. The Load Test Apparatus 100 of the present invention is more capable of safely withstanding the effects of side loads than that of the apparatus shown in FIG. 10.

OPERATION

In operation, the Load Test Apparatus Assembly 100 of applicant's invention is lowered into the Basket 160 and positioned such that Axis 220 of the Beam 200 is coincident with the Longitudinal Plane 360 of the Basket 160, i.e., the Beam 200 is centered within the Basket 160. The Adjustment Pin 430 of each Pivotal Plate Assembly 210 is moved axially to the Retracted Position 630, as shown in FIG. 7B. Each Pivotal Plate Assembly 210 is moved axially along Beam 200 such that each Pivotal Plate Assembly 210 is equidistant from the Transverse Plane 370 of Basket 160 and a distance D1 from the end of Basket 160. A first Clevis 30 of a first Cable Assembly 130 is attached to a first Lifting Eye 330. The second Clevis 300 of the first Cable Assembly 130 is attached to a selected Hole 510 of a Pivotal Plate 410. As described above, the selection of Hole 510 determines the size of the projected Angle A1. Projected Angle A1 must be no less than 45 degrees from a horizontal plane. Conversely, it is desirable that the selected Hole 510 be as near to Longitudinal Plate 360 (that is, as near to the Beam 200) as possible in order to minimize the stresses within Pivotal Plate 410. The Hole 510 is therefore selected such that it is as near to the Beam 200 as possible while still allowing projected Angle A1 to be equal to or greater than 45 degrees. The remaining three Cable Assemblies 130 are attached to the remaining Lifting Eyes 330 and to Holes 510 in the same relative position as the first Hole 510 selected as described above. Thus, the connections of the Cables 130 to the Pivotal Plates 410 will be symmetrical about both the Longitudinal Plane 360 and the Transverse Plate 370

After all four Cable Assemblies 130 are attached to the four Lifting Eyes, the Pivotal Plate Assemblies 210 are then attached to the Beam 200. The procedure for positioning and attaching a first Pivotal Plate Assembly 210 to Beam 200 is described below. The second Pivotal Plate Assembly 210 is the attached in a similar manner such that the position if the two Pivotal Plate Assemblies 210 is symmetrical about the Transverse Plane 370.

The Pivotal Plate Assembly 210 is attached to Beam 200 by inserting the Adjustment Pin 430 through a selected Adjustment Hole 230 in Beam 200. As described above, the projected Angle A2 must be no less than 45 degrees from a horizontal plane. Distance D1, from the end of the Basket 160 to the Cylinder Assembly 120, determines the magnitude of Angle A2. An Adjustment Hole 230 is selected such that Angle A2 is equal to or greater than 45 degrees. After selection of the appropriate Adjustment Hole 230, the Pivotal Plate Assembly 210 is moved axially along Beam 200 until the Alignment Pin 430 is coaxially aligned with the selected Adjustment Hole 230. The Adjustment Pin 430 is moved axially within the Adjustment Pin Housing 725 until it is in the Extended Position 640 as shown in FIG. 7A.

Hydraulic hoses are connected to the Hydraulic Pump Assembly 150 and the Hydraulic Cylinder Assemblies 120. The Load Cell 450 is electrically connected to the Load Indicator 140. This electrical connection may be made either by using wires or by radio-telepathy.

The Hydraulic Pump Assembly 150 is activated to energize the Hydraulic Cylinder Assemblies 120 so that the desired testing load is applied by the Hydraulic Cylinder Assemblies 120 to the Beam Assembly 110, as measured by Load Cell 450 and displayed by Load Indicator 140. This test load may be held for some amount of time as required by the governing standard or procedure.

After the test load has been applied to the basket for the required amount of time, the Hydraulic Cylinder Assemblies 120 are de-energized, the Cable Assemblies 130 are removed from the Lifting Eyes 330 of the Basket 160, the Hydraulic Hoses are removed from the Hydraulic Cylinder Assemblies 120, the Load Cell 450 is disconnected from the Load Indicator 140, and the Load Test Apparatus 100 is removed from the Basket 160.

The foregoing description is merely an illustration of the principles of the Load Test Apparatus of Applicants' invention. Since numerous modifications and changes will readily occur to those skilled in the art, the description is not intended to limit the invention to the exact construction and operation shown and described. Accordingly, all suitable modifications and equivalents are intended to fall within the scope of the invention.

We claim:

1. A container load test apparatus comprising:
   (a) a horizontal beam having a longitudinal axis and a transverse axis,
   (b) two beam supports,
   (c) means for slidably positioning said beam supports at a desired location along said longitudinal axis of said horizontal beam,
   (d) a cable attachment plate pivotally attached to each of said beam supports whereby said cable attachment plate pivots about said transverse axis of said horizontal beam,
   (e) a plurality of cables extending from a container to each said cable attachment plate, and
   (f) means for applying a desired load to said beam supports and thereby to said container through said plurality of cables.

2. The apparatus as recited in claim 1 wherein said beam supports include vertically orientated hydraulic cylinders.

3. The apparatus as recited in claim 2 wherein each said cable of said plurality of cables has a first and second end and a clevis mounted to said cable at each of said cable ends.

4. The apparatus as recited in claim 3 wherein said cable attachment plate has a plurality of cable attachments holes for selective attachment of said clevis of one of said cable ends to said cable attachment plate.

5. The apparatus as recited in claim 4 wherein each said cable with said attached devises are of the same length.

6. The apparatus as recited in claim 5, wherein said horizontal beam has a plurality of horizontally positioned adjustment holes bored transverse to the longitudinal axis and of said horizontal beam and wherein said means for slidably positioning said beam supports at a desired location along said longitudinal axis of said horizontal beam includes:
   (a) a beam housing having an opening for slidably receiving said horizontal beam, said beam housing having a transverse bore selectively coinciding with a selected said adjustment hole of said horizontal beam, and
   (b) a beam support pin for engaging said transverse bore of said beam housing and said selected adjustment hole of said horizontal beam whereby said horizontal beam and said beam housing are held in place at said selected adjustment hole of said horizontal beam.

7. The apparatus as recited in claim 6, wherein said cable attachment plate pivotally attached to each of said beam supports is pivotally attached to said beam supports by said beam support pin.

8. The apparatus as recited in claim 7, wherein said vertically orientated hydraulic cylinders having horizontally oriented base plates for supporting said hydraulic cylinders on the floor of said container.

9. The apparatus as recited in claim 8, wherein said beam support pin may be adjusted to allow said beam support to slide axially along said longitudinal axis of said horizontal beam, while said cable attachment plate is still pivotally attached to said beam support.

10. The apparatus as recited in claim 9, further comprising:
   (a) means for pressurizing said hydraulic cylinders and thereby apply desired loads to said containers from said cables;
   (b) a load indicator; and
   (c) a load cell positioned on each said beam support for measuring the load transmitted to the beams supports and transmitting a signal reflecting the measured loads to said load indicator.

11. A container load test apparatus comprising:
   (a) a horizontal beam;
   (b) two beam supports;
   (c) means for slidably positioning said beam supports along the longitudinally axis of said horizontal beam;
   (d) a vertical lifting support attached to each of said beam supports for applying a desired lifting load to said horizontal beam; and
   (e) at least two cable assemblies adapted to pivotally connect each said beam support to the lifting eyes of a typical basket container.

12. The apparatus as recited in claim 11 wherein each said vertical lifting support includes:
   (a) stationary cylinder;
   (b) a coaxial piston rod extending vertically upward from the top of said stationary cylinder;

(c) a horizontal base plate attached to the base of said stationary cylinder; and (d) a pump assembly for pressurizing and depressurizing said cylinder and thereby extending and retracting said piston rod from said stationary cylinder.

13. The apparatus as recited in claim 12 further comprising a load cell for measuring the load applied to said beam supports by said piston rods and a load indicator for receiving a signal from the load cell displaying said applied load.

14. The apparatus as recited in claim 13 wherein said horizontal beam has a plurality of horizontally positioned adjustment holes bored transverse to the longitudinal axis and of said horizontal beam and wherein said means for slidably positioning said beam supports at a desired location along said longitudinal axis of said horizontal beam includes:

(a) a beam housing having an opening for slidably receiving said horizontal beam, said beam housing having a transverse bore selectively coinciding with a selected said adjustment hole of said horizontal beam, and (b) a beam support pin for engaging said transverse bore of said beam housing and said selected adjustment hole of said horizontal beam whereby said horizontal beam and said beam housing are held in place at said selected adjustment hole of said horizontal beam.

15. The apparatus as recited in claim 14 further comprising a cable attachment plate pivotally attached to each said beam support by said beam support pin.

16. The apparatus as recited in claim 15 wherein each said cable attachment plate has a plurality of cable attachments holes for selective attachment of cable assemblies to said cable attachment plate.

17. The apparatus as recited in claim 16, wherein said beam support pin may be adjusted to allow said beam support to slide axially along said longitudinal axis of said horizontal beam, while said cable attachment plate is still pivotally attached to said beam support.

18. The apparatus as recited in claim 17, wherein the line of action from the force transmitted from said piston rods through said load cell and through said beam housing is transmitted to said beam support pin and then through said attachment plate to said cable assemblies to said lifting eyes of said container so that the resultant of these forces is transmitted to the horizontal beam through said beam support pin with substantially no moment loads applied on any of these elements.

\* \* \* \* \*

(12) EX PARTE REEXAMINATION CERTIFICATE (6977th)
United States Patent
Foley et al.

(10) Number: US 7,240,569 C1
(45) Certificate Issued: Aug. 4, 2009

(54) LOAD TEST APPARATUS FOR SHIPPING CONTAINERS

(75) Inventors: Lawrence E. Foley, Lafayette, LA (US);
Paul Justin, Youngsville, LA (US);
Gregory Smith, Lafayette, LA (US)

(73) Assignee: Integrcert, L.L.C., New Iberia, LA (US)

Reexamination Request:
No. 90/009,197, Jun. 19, 2008

Reexamination Certificate for:
Patent No.: 7,240,569
Issued: Jul. 10, 2007
Appl. No.: 11/241,302
Filed: Sep. 28, 2005

Related U.S. Application Data

(60) Provisional application No. 60/614,303, filed on Sep. 28, 2004.

(51) Int. Cl.
*G01D 7/00* (2006.01)

(52) U.S. Cl. .................................. 73/862.41
(58) Field of Classification Search ............... None
See application file for complete search history.

(56) References Cited

U.S. PATENT DOCUMENTS

| | | |
|---|---|---|
| 6,848,322 B2 | 2/2005 | Scarborough |
| 6,935,196 B1 | 8/2005 | Tumlin |
| 7,155,987 B1 | 1/2007 | Tumlin |

*Primary Examiner*—Sharon Payne

(57) ABSTRACT

Load test apparatus for shipping containers comprising a horizontal beam (200), the beam having pivotal plate assemblies (210) attached to lifting eyes (330) or other feature of a container by cables (130) or similar means, extending from the pivotal plates to the lifting eyes. The pivotal plates rotate about a horizontal pin (430) permitting the pivotal plates to become axially aligned with the cables. The Horizontal beam is forced vertically upward by a plurality of force generating means such as hydraulic cylinders (120). The force of the force generating means is applied through a point common to the longitudinal axis of the horizontal beam and the axis of the horizontal pin, thereby eliminating moment loads within components of the assembly. The opposite vertically downward reaction force is applied to the bottom of the container and simulates the force applied by the weight of the typical contents of the container when it is in use.

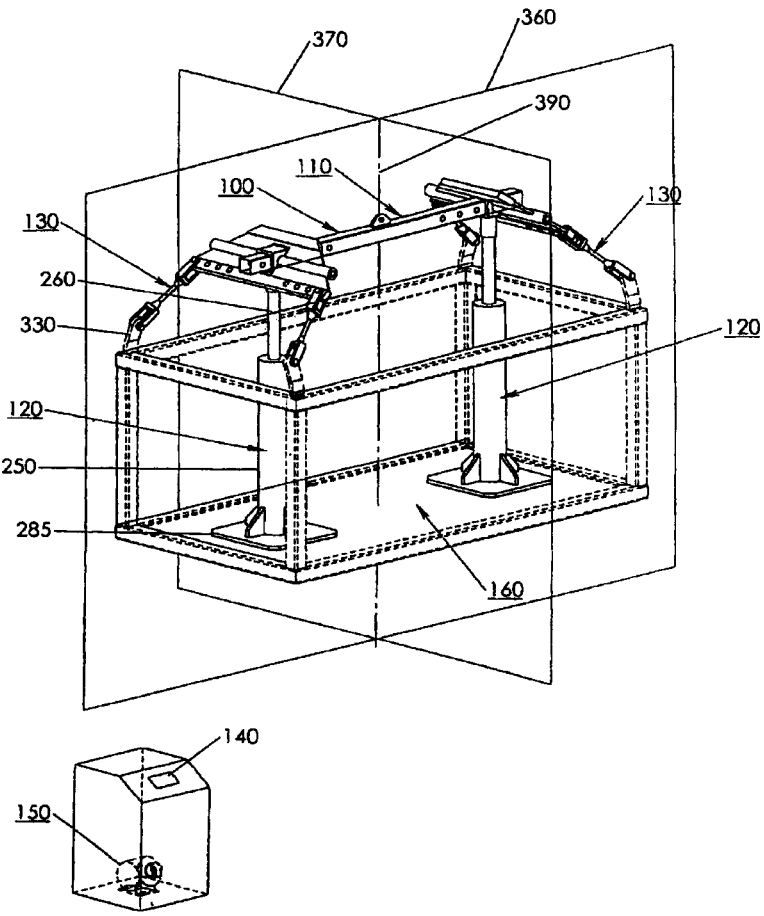

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–18 is confirmed.

New claims 19–27 are added and determined to be patentable.

19. *A container load test apparatus comprising:*
   *(a) a horizontal beam having a longitudinal axis and a transverse axis;*
   *(b) two beam supports;*
   *(c) means for slidably positioning said beam supports at a desired location along said longitudinal axis of said horizontal beam;*
   *(d) a cable attachment plate pivotally attached to each of said beam supports whereby said cable attachment plate pivots about said transverse axis of said horizontal beam;*
   *(e) a plurality of cables extending from a container to each said cable attachment plate; and*
   *(f) means for applying a desired load to said beam and thereby to said container through said plurality of cables, wherein the line of action from said applied load to said beam supports is transmitted from said beam supports through said cable attachment plate to said cables and said container so that the resultant of these forces is transmitted through said horizontal beam with substantially no moment loads applied on any of these elements.*

20. *A container load test apparatus comprising:*
   *(a) a horizontal beam;*
   *(b) two beam supports;*
   *(c) means for slidably positioning said beam supports along the longitudinal axis of said horizontal beam;*
   *(d) a vertical lifting support attached to each said beam support for applying a desired lifting load to each said beam support;*
   *(e) at least two cable assemblies adapted to pivotally connect each said beam support to the lifting eyes of a typical basket container; and*
   *(f) a cable attachment plate pivotally attached to each said beam support, each said cable attachment plate having at least two cable assemblies pivotally attached to said cable attachment plate.*

21. *The apparatus as recited in claim 20 wherein said horizontal beam has a plurality of horizontally positioned adjustment holes bored transverse to the longitudinal axis of said horizontal beam and wherein said means for slidably positioning said beam supports at a desired location along said longitudinal axis of said horizontal beam includes:*
   *(a) a beam housing having an opening for slidably receiving said horizontal beam, said beam housing having a transverse bore selectively coinciding with a selected said adjustment hole of said horizontal beam, and*
   *(b) a beam support pin for engaging said transverse bore of said beam housing and said selected adjustment hole of said horizontal beam whereby said horizontal beam and said beam housing are held in place at said selected adjustment hole of said horizontal beam.*

22. *The apparatus as recited in claim 21 wherein each said cable attachment plate is pivotally attached to each said beam support by said beam support pin.*

23. *The apparatus as recited in claim 22 wherein each said cable attachment plate has a plurality of cable attachments holes for selective attachment of said cable assemblies to said cable attachment plate.*

24. *The apparatus as recited in claim 23, wherein said beam support pin may be adjusted to allow said beam support to slide axially along said longitudinal axis of said horizontal beam, while said cable attachment plate is still pivotally attached to said beam support.*

25. *The apparatus as recited in claim 24, wherein the line of action from the force transmitted from said vertical lift support through said beam housing is transmitted to said beam support pin and then through said cable attachment plate to said cable assemblies to a desired cable attachment end point so that the resultant of these forces is transmitted to the horizontal beam through said beam support pin with substantially no bending moment loads applied on any of these elements.*

26. *The apparatus as recited in claim 25 wherein each said vertical lifting support includes:*
   *(a) stationary cylinder;*
   *(b) a coaxial piston rod extending vertically upward from the top of said stationary cylinder;*
   *(c) a horizontal base plate attached to the base of said stationary cylinder; and*
   *(d) a pump assembly for pressurizing and depressurizing said cylinder and thereby extending and retracting said piston rod from said stationary cylinder.*

27. *The apparatus as recited in claim 26 further comprising a load cell for measuring the load applied to said beam supports by said piston rods and a load indicator for receiving a signal from the load cell displaying said applied load.*

\* \* \* \* \*